United States Patent
Lee et al.

(10) Patent No.: US 10,643,581 B2
(45) Date of Patent: May 5, 2020

(54) HEAD MOUNT DISPLAY DEVICE AND OPERATION METHOD OF THE SAME

(71) Applicant: Samsung Display Co., Ltd., Yongin-si, Gyeonggi-do (KR)

(72) Inventors: Donggyu Lee, Suwon-si (KR); Jaekeun Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/963,927

(22) Filed: Apr. 26, 2018

(65) Prior Publication Data

US 2019/0114996 A1    Apr. 18, 2019

(30) Foreign Application Priority Data

Oct. 16, 2017 (KR) ........................ 10-2017-0134257

(51) Int. Cl.
| | | |
|---|---|---|
| *G09G 5/38* | (2006.01) | |
| *G06F 3/01* | (2006.01) | |
| *G06F 3/0484* | (2013.01) | |
| *G09G 3/00* | (2006.01) | |

(52) U.S. Cl.
CPC ............... *G09G 5/38* (2013.01); *G06F 3/013* (2013.01); *G06F 3/04845* (2013.01); *G09G 3/003* (2013.01); *G09G 2320/028* (2013.01); *G09G 2320/068* (2013.01); *G09G 2320/08* (2013.01); *G09G 2340/0464* (2013.01); *G09G 2340/0485* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 9,213,185 | B1 * | 12/2015 | Starner | ................ G02B 27/017 |
| 2013/0293447 | A1 * | 11/2013 | Bickerstaff | .......... G02B 27/646 345/8 |
| 2014/0364229 | A1 * | 12/2014 | Yamamoto | ............ A63F 13/213 463/32 |
| 2016/0078685 | A1 * | 3/2016 | Koga | ...................... G06F 3/013 345/633 |
| 2017/0123489 | A1 * | 5/2017 | Guenter | ............... G02B 27/017 |
| 2017/0160798 | A1 | 6/2017 | Lanman et al. | |

(Continued)

OTHER PUBLICATIONS

Zhu, Dingyun, Tom Gedeon, and Ken Taylor. ""Moving to the centre": A gaze-driven remote camera control for teleoperation." Interacting with Computers 23.1 (2010): 85-95.*

(Continued)

*Primary Examiner* — Ryan M Gray
(74) *Attorney, Agent, or Firm* — Lewis Roca Rothgerber Christie LLP

(57) ABSTRACT

A head mount display (HMD) device includes: a display unit configured to display an image to a user based on an image signal; a viewpoint detector configured to detect a viewpoint corresponding to an object of the user's focus and configured to generate a viewpoint signal; and a controller configured to move the display unit based on the viewpoint signal and to generate a compensation image signal corresponding to the viewpoint signal such that the object of the user's focus is at a center of the display unit.

20 Claims, 10 Drawing Sheets

(56) References Cited

U.S. PATENT DOCUMENTS

| | | | |
|---|---|---|---|
| 2017/0232343 A1* | 8/2017 | Yoshioka | A63F 13/5258 |
| | | | 463/31 |
| 2018/0061116 A1* | 3/2018 | Mitchell | G06T 15/20 |
| 2018/0096533 A1* | 4/2018 | Osman | A63F 13/25 |
| 2018/0158242 A1* | 6/2018 | Sugawara | G06F 3/011 |
| 2018/0165830 A1* | 6/2018 | Danieau | G06F 3/012 |
| 2018/0267323 A1* | 9/2018 | Tsurumi | G02B 27/02 |

OTHER PUBLICATIONS

Jönsson, Erika. "If looks could kill—an evaluation of eye tracking in computer games." Unpublished Master's Thesis, Royal Institute of Technology (KTH), Stockholm, Sweden (2005).*

Stellmach, Sophie, and Raimund Dachselt. "Investigating gaze-supported multimodal pan and zoom." Proceedings of the Symposium on Eye Tracking Research and Applications. ACM, 2012.*

Fauster, Loris, and T. U. Wien. "Stereoscopic techniques in computer graphics." Tu Wien (2007).*

\* cited by examiner

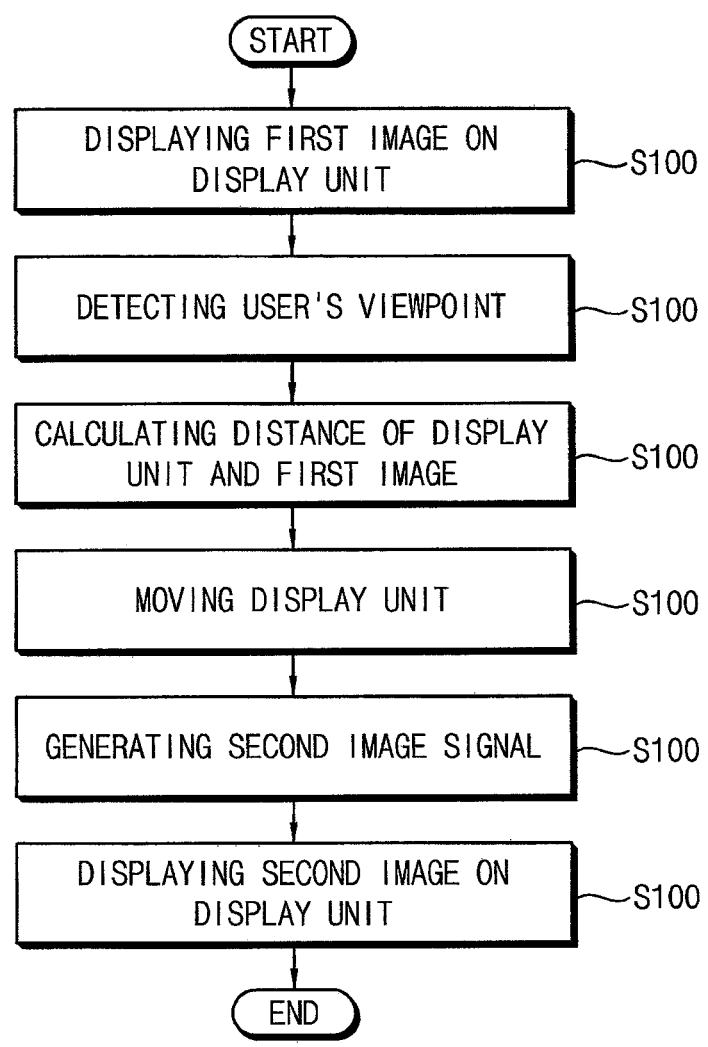

HEAD MOUNT DISPLAY DEVICE AND OPERATION METHOD OF THE SAME

CROSS-REFERENCE TO RELATED APPLICATION

This application claims priority to and the benefit of Korean Patent Application No. 10-2017-0134257, filed on Oct. 16, 2017 in the Korean Intellectual Property Office (KIPO), the entire content of which is incorporated herein by reference.

BACKGROUND

1. Field

Example embodiments of the present invention relate generally to a head mount (or head mounted) display device and an operation (or operating) method of the same.

2. Description of the Related Art

Flat panel display (FPD) devices are widely used as display devices of electronic devices because FPD devices are relatively lightweight and thin compared to cathode-ray tube (CRT) display devices. Examples of FPD devices include liquid crystal display (LCD) devices, field emission display (FED) devices, plasma display panel (PDP) display devices, and organic light emitting diode (OLED) display devices. OLED display devices have been spotlighted as a next-generation display device because they have various features, such as a wide viewing angle, a rapid response speed, a thin thickness, low power consumption, etc.

SUMMARY

Some example embodiments of the present invention include a head mount display device having improved display quality.

Other example embodiments of the present invention include an operation method of a head mount display device providing improved display quality.

According to an example embodiment, a head mount display (HMD) device includes: a display unit configured to display an image to a user based on an image signal; a viewpoint detector configured to detect a viewpoint corresponding to an object of the user's focus and configured to generate a viewpoint signal; and a controller configured to move the display unit based on the viewpoint signal and to generate a compensation image signal corresponding to the viewpoint signal such that the object of the user's focus is at a center of the display unit.

The controller may include: a distance calculator configured to calculate a moving distance of the display unit and the image signal based on the viewpoint signal and to generate a moving signal; a first controller configured to move the display unit based on the moving signal; and a second controller configured to generate the compensation image signal corresponding to a compensation image. The compensation image may be a shifted version of the image based on the moving signal.

The first controller may be configured to move the display unit a first distance during a non-emission period of a frame.

The first controller may be configured to move the display unit during a plurality of frames.

The second controller may generate the compensation image signal corresponding to the compensation image shifted by a first distance during the non-emission period of a plurality of frames.

The second controller may generate a left-eye compensation image signal corresponding to the user's left eye and a right-eye compensation image signal corresponding to the user's right eye.

The viewpoint signal may include displacement information.

The viewpoint signal may include coordinate information.

The display unit may display a left-eye image corresponding to the user's left eye and a right-eye image corresponding to the user's right eye.

The left-eye image and the right-eye image may be the same.

The left-eye image and the right-eye image may be different from each other.

According to an example embodiment, an operation method of a head mount display (HMD) device includes: displaying a first image on a display unit based on a first image signal; detecting a viewpoint corresponding to eyes of a user who is viewing the first image; calculating a moving distance of the display unit and the first image based on the detected viewpoint; moving the display unit based on the moving distance; generating a second image signal corresponding to a second image, the second image being a shifted version of the first image based on the moving distance; and displaying the second image on the display unit based on the second image signal.

The display unit may move a first distance based on the moving distance during a non-emission period of a frame.

The display unit may move during a plurality of frames.

The second image signal corresponding to the second image may be generated for a plurality of frames. The second image signal may be shifted by a first distance for each of the frames.

The generating of the second image signal may include generating a left-eye compensation image signal corresponding to the user's left eye and generating a right-eye compensation image signal corresponding to the user's right eye.

The detected viewpoint may include displacement information with respect to a center of the display unit.

The detected viewpoint may include coordinate information with respect to a center of the display unit.

When the second image is displayed on the display unit, the detected viewpoint may be at a center of the display unit.

According to an example embodiment, a head mount display (HMD) device includes: a housing; a display unit accommodated in the housing and configured to display an image to a user based on an image signal; a viewpoint detector configured to detect the user's viewpoint and configured to generate a viewpoint signal corresponding to the user's viewpoint; and a controller configured to move the display unit within the housing based on the viewpoint signal and to generate a compensation image signal corresponding to the viewpoint signal such that the image displayed by the display unit is shifted as the display unit moves within the housing. The compensation signal is a shifted version of the image signal.

A head mount display device, according to an operation method thereof, may detect a user's viewpoint and move the display unit and an image displayed thereon to be at a center of the display unit so that the user's viewpoint is at the center of the display unit. Thus, the user may not recognize a display quality difference between the center of the display unit and an edge of the display unit.

BRIEF DESCRIPTION OF THE DRAWINGS

The present invention will be more clearly understood from the following detailed description of exemplary embodiments, taken in conjunction with the accompanying drawings.

FIG. 10 is a flowchart illustrating an operation method of a head mount display device according to an example embodiment.

DETAILED DESCRIPTION

Figure 1:
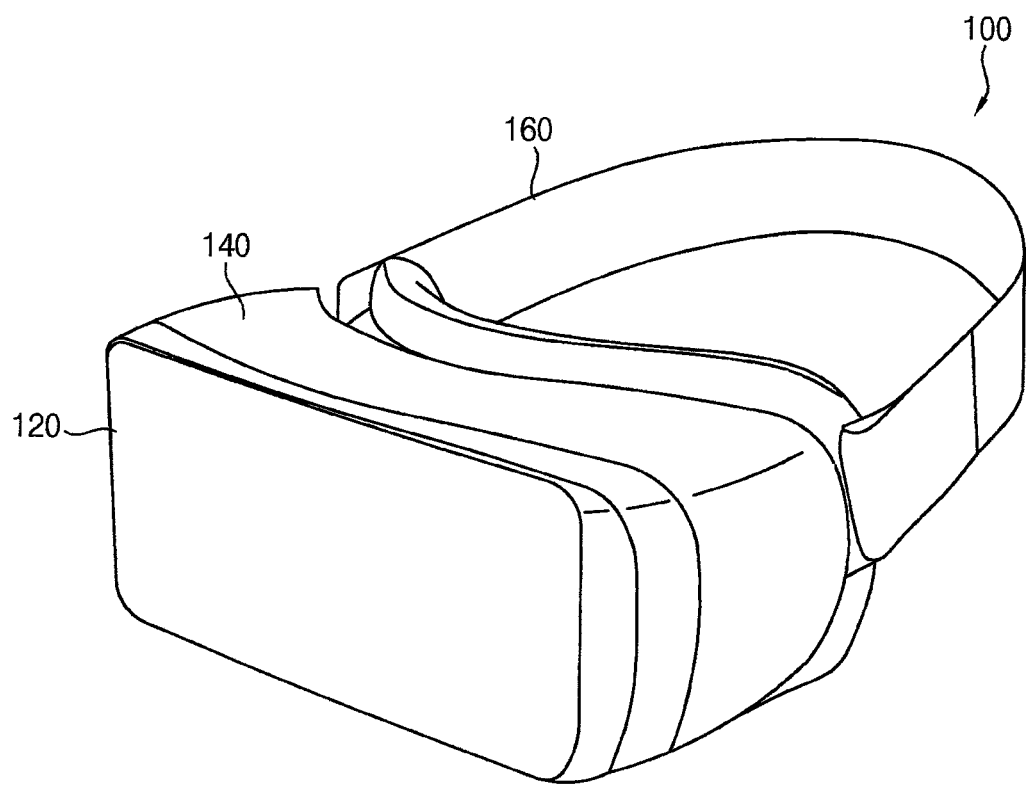
FIG. 1 is a diagram illustrating a head mount display device according to an example embodiment.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The viewpoint detector, controller, and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the viewpoint detector and/or controller may be formed on one integrated circuit (IC) chip or on separate IC chips. Further, the various components of the viewpoint detector and/or controller may be implemented on a flexible printed circuit film, a tape carrier package (TCP), a printed circuit board (PCB), or formed on a same substrate as the viewpoint detector and/or controller. Further, the various components of the viewpoint detector and/or controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Hereinafter, aspects and features of the present invention will be explained in detail with reference to the accompanying drawings.

Figure 2:
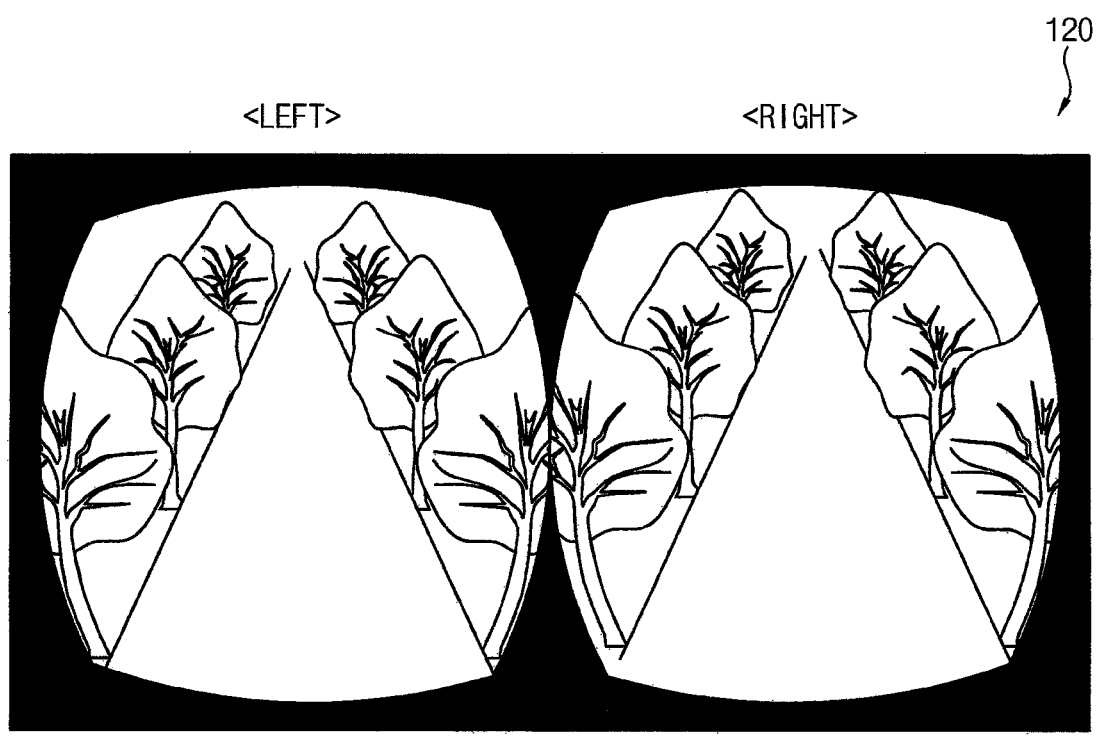
FIG. 2 is a diagram illustrating a display unit included in the head mount display device shown in FIG. 1.
Figure 3A:
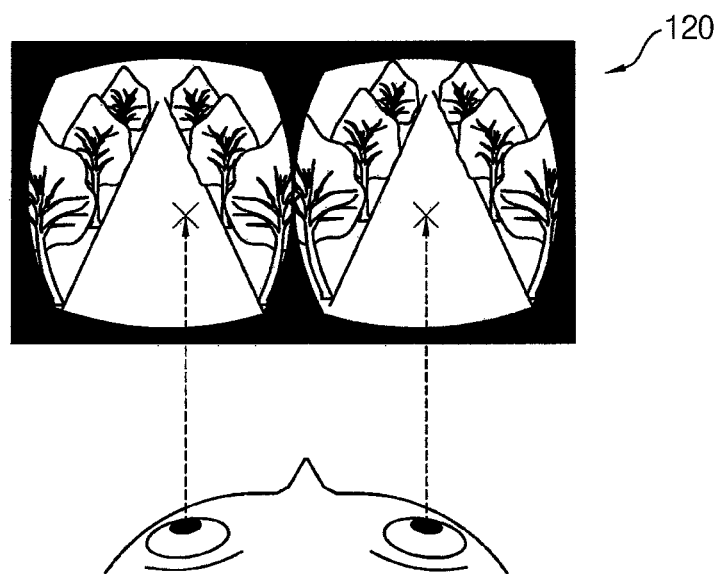
FIGS. 3A and 3B are diagrams describing the display unit shown in FIG. 2.
Figure 3B:
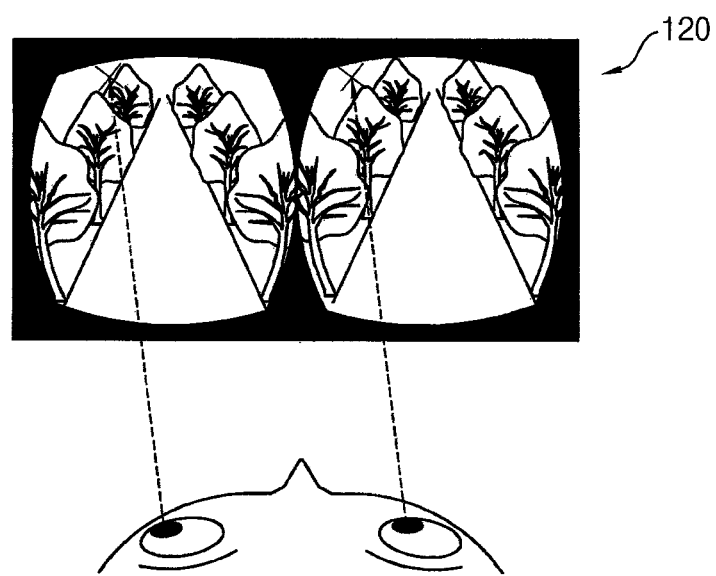

FIG. 1 is a diagram illustrating a head mount display device according to an example embodiment, FIG. 2 is a diagram illustrating a display unit included in the head mount display device shown in FIG. 1, and FIGS. 3A and 3B are diagrams describing the display unit shown in FIG. 2.

Referring to FIG. 1, a head mount display (HMD) device 100 may include a display unit 120, a housing 140, and a mounting part 160.

The head mount display device 100 may be mounted on a user's head. The head mount display device 100 may provide (e.g., display) an image (e.g., image information) to the user. The display unit 120 may output the image. As described in FIG. 2, the display unit 120 may provide an image to the user's left eye (e.g., a left-eye image) and to the user's right eye (e.g., a right-eye image). The left-eye image corresponding to the user's left eye and the right-eye image corresponding to the user's right eye may be the same. In other embodiments, the left-eye image corresponding to the user's left eye and the right-eye image corresponding to the user's right eye may be different from each other. The head mount display device 100 may provide a 2D image, a 3D image, a virtual reality image, a 360-degree panoramic image, etc. to the display unit 120.

The display unit 120 may further include an optical lens that induces (e.g., focuses or directs) the image displayed on the display unit 120 to the user's eyes. A display quality of an image at a center of the display unit 120 and a display quality of an image at an edge of the display unit 120 may be different due to, for example, the optical lens as further described with respect to FIG. 2. Referring to FIGS. 3A and 3B, when the user moves her eyes from the center of the display unit 120 to the edge of the display unit 120, the user may recognize the difference in display quality between the center of the display unit 120 and the edge of the display unit 120. The head mount display device 100, according to example embodiments, may prevent the user from noticing the difference in the display quality between the center of the display unit 120 and the edge of the display unit 120 by detecting the user's viewpoint (e.g., by detecting a viewpoint corresponding to the user's eyes) and locating the user's viewpoint at the center of the display unit 120 by moving the display unit 120 and the image displayed on the display unit 120 (e.g., by moving the display unit 120 and by shifting the image displayed on the display unit 120). Hereinafter, the head mount display device 100 will be described in more detail with reference to FIG. 4.

The display unit 120 may include (or may be) a liquid crystal display (LCD) device or an organic light emitting diode (OLED) display device. The display unit 120 may be a flexible display device. The display unit 120 may be located in (e.g., accommodated in) the housing 140 or may be combined with (e.g., integral with) the housing 140. The display unit 120 may receive a command (e.g., data, power, etc.) through an interface included in the housing 140.

The housing 140 may include elements and/or components that operate (e.g., that drive) the head mount display device 100. For example, the housing 140 of the head mount display device 100 may include a wireless communication device (or wireless communication component), an interface, a memory, a power supply, etc. The wireless communication device may wirelessly receive an image signal from an external device. For example, the wireless communication device may communicate with the external device by using Bluetooth® (a registered trademark of Bluetooth Sig, Inc., Kirkland, Wash.), radio frequency identification (RFID), infrared data association (IrDA), ZigBee® (a registered trademark of Philips Electronics North America Corp., New York, N.Y.), Near Field Communication (NFC), wireless-fidelity (Wi-Fi), ultra-wideband (UWB), etc. communication protocols.

The interface may couple the head mount display device 100 to an external device. For example, the head mount display device 100 may receive external power from the external device by using (e.g., through) the interface.

The memory may store data that supports various functions of the head mount display device 100. For example, the head mount display device 100 may store data and commands for operating a plurality of application programs or applications operated by the head mount display device 100. The power supply may provide power to each of the elements of the head mount display device 100 by receiving external power or internal power. For example, the power supply may be (or may include) an embedded battery or a replaceable battery.

The mounting part 160 may be coupled to the housing 140. The head mount display device 100 may be mounted on the user's head by the mounting part 160. For example, the mounting part 160 may be implemented as a belt or an elastic band.

Figure 4:
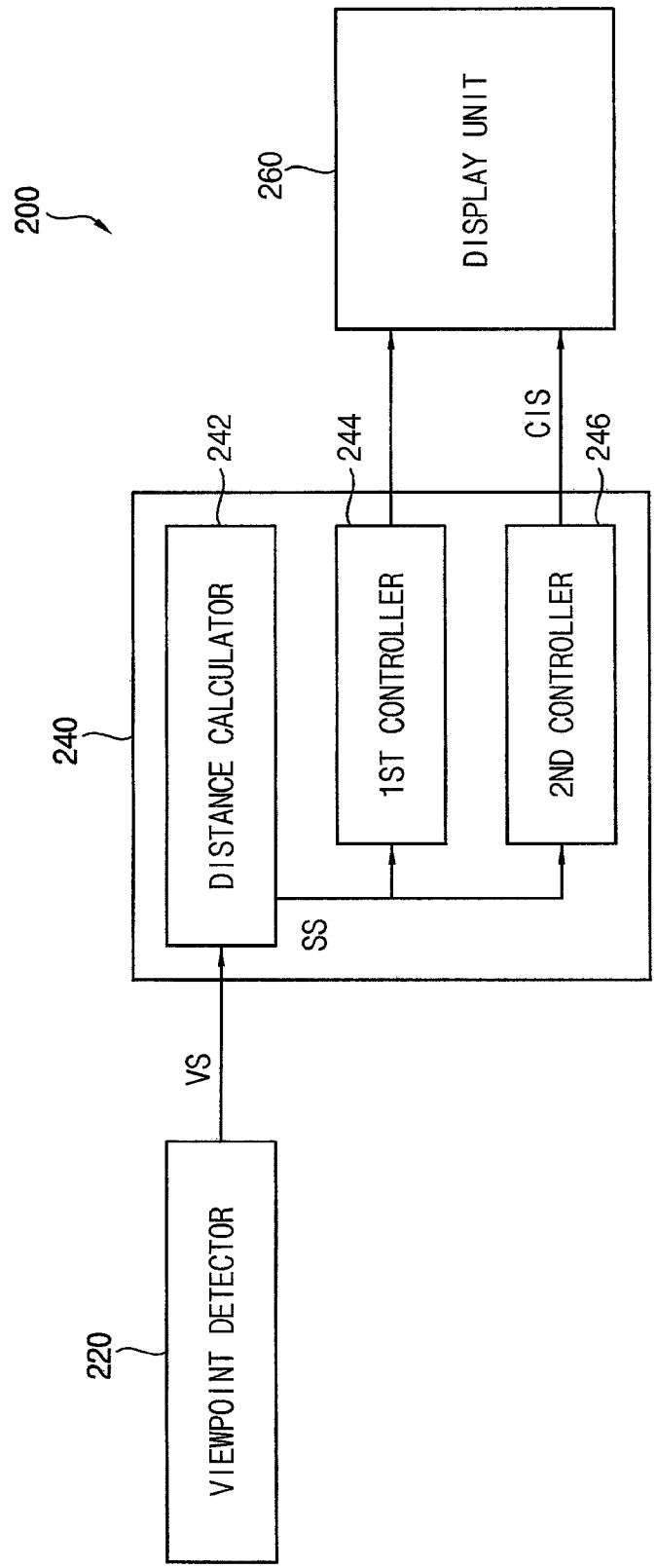
FIG. 4 is a block diagram illustrating the head mount display device shown in FIG. 1.
Figure 5A:
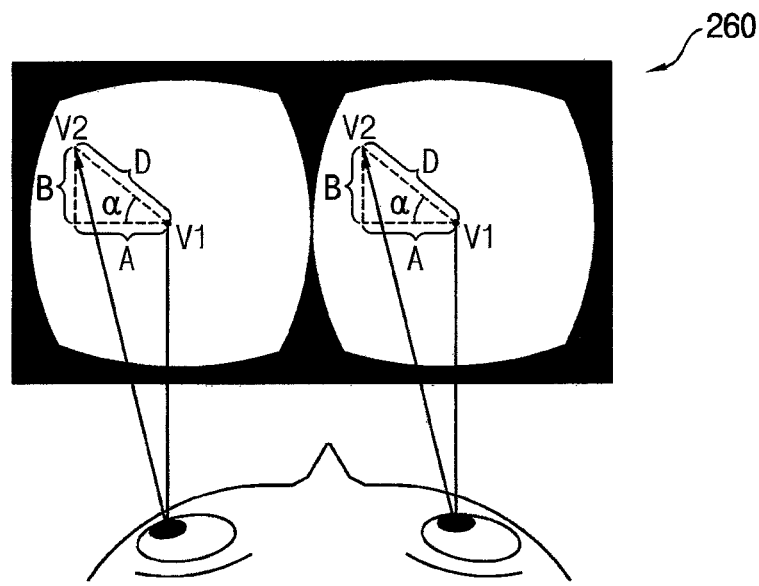
FIGS. 5A and 5B are diagrams describing a distance calculator included in the head mount display device shown in FIG. 4.
Figure 5B:
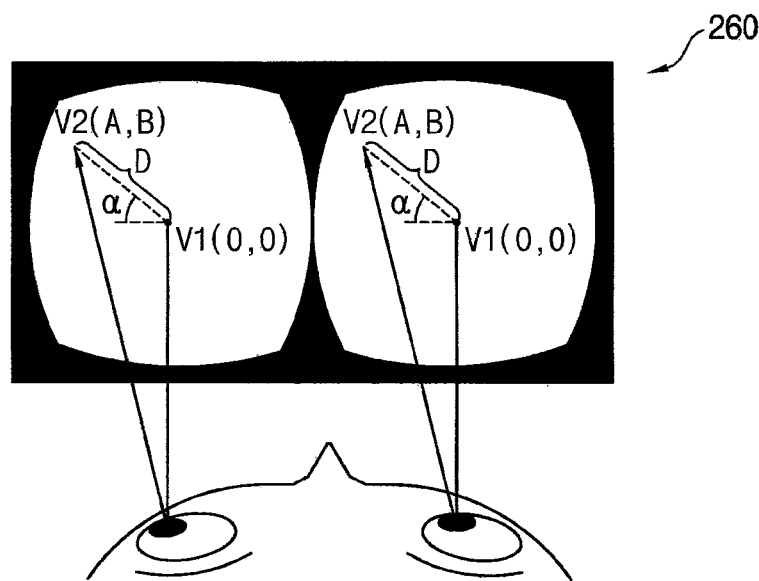
Figure 6A:
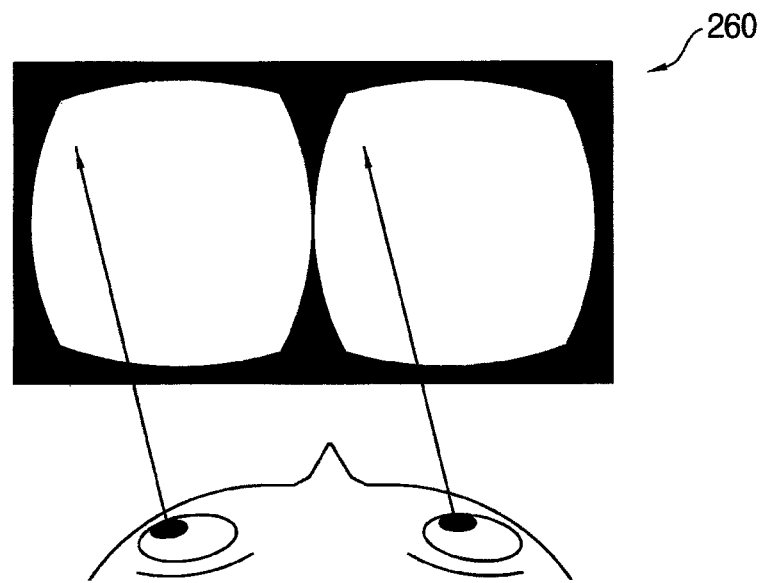
FIGS. 6A and 6B are diagrams describing an operation of a first controller included in the head mount display device shown in FIG. 4.
Figure 6B:
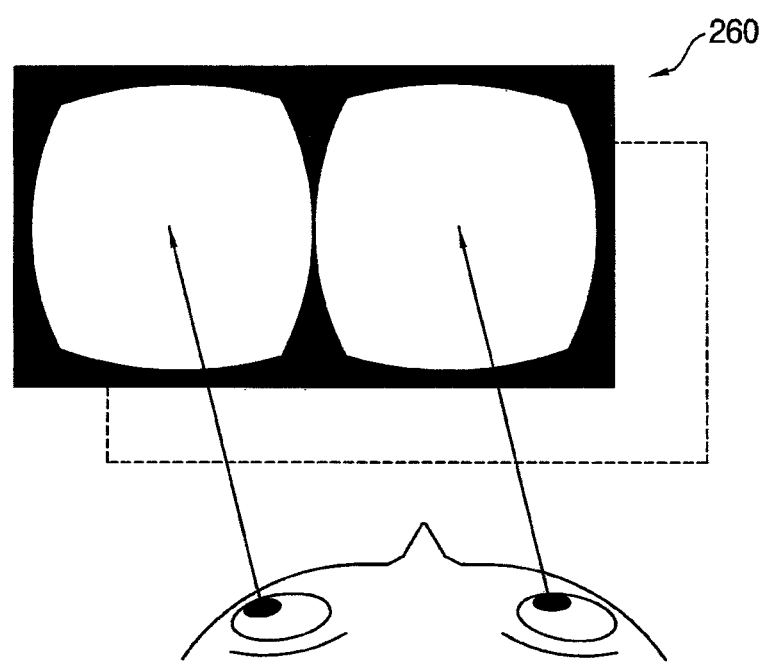
Figure 7A:
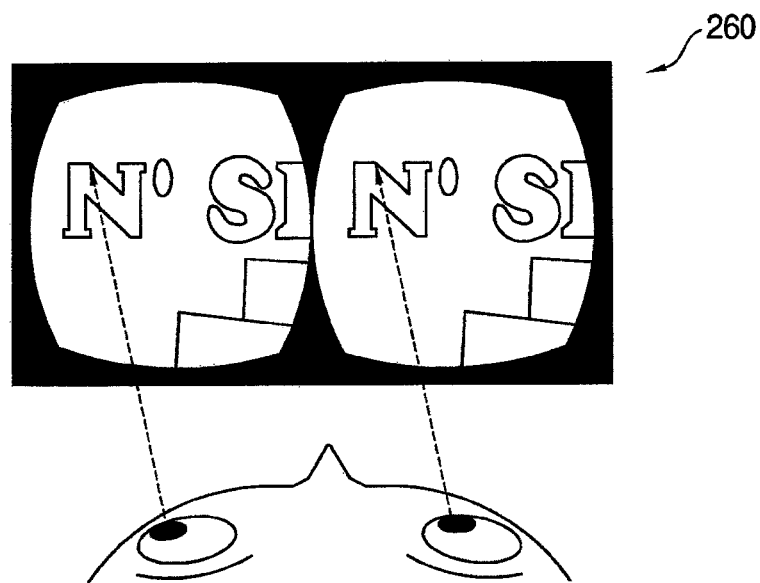
FIGS. 7A and 7B are diagrams describing an operation of a second controller included in the head mount display device shown in FIG. 4.
Figure 7B:
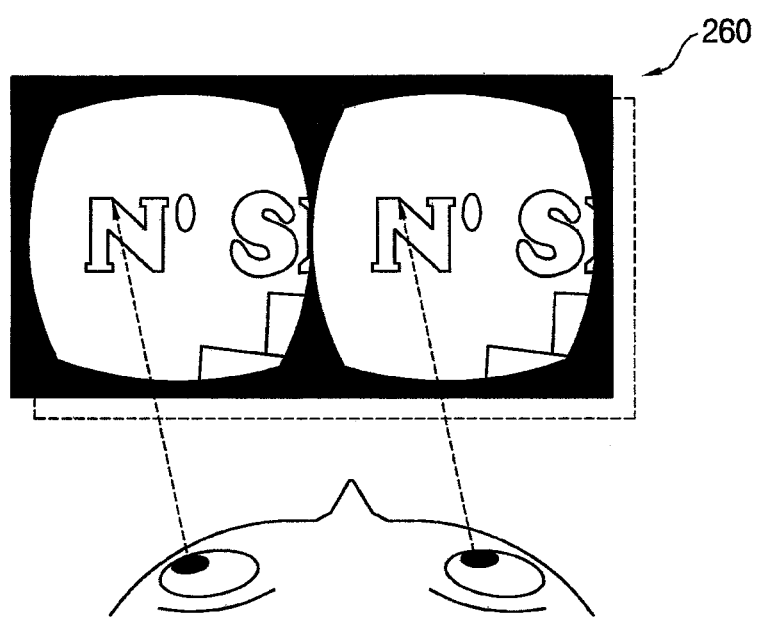

FIG. 4 is a block diagram illustrating the head mount display device 100 shown in FIG. 1. FIGS. 5A and 5B are diagrams describing a distance calculator included in the head mount display device shown in FIG. 4, FIGS. 6A and 6B are diagrams describing an operation of a first controller included in the head mount display device shown in FIG. 4, and FIGS. 7A and 7B are diagrams describing an operation of a second controller included in the head mount display device shown in FIG. 4.

Referring to FIG. 4, the head mount display device 200 may include a viewpoint detector 220, a controller 240, and a display unit 260. The display unit 260 shown in FIG. 4 may correspond to the display unit 120 shown in FIG. 1.

The display unit 260 may display an image based on an image signal provided from an external device. The display unit 260 may display a left-eye image corresponding to a user's left eye and a right-eye image corresponding to the user's right eye. The left-eye image and the right-eye image may be the same or may be different from each other.

The viewpoint detector 220 may detect the user's viewpoint corresponding to the eyes of the user who views the image and may generate a viewpoint signal VS. The viewpoint detector 220 may detect the user's viewpoint by using ultraviolet rays (e.g., an ultraviolet signal) and/or a camera. For example, the viewpoint detector 220 may trace a location of the user's pupils by sending (e.g., emitting) ultraviolet rays and analyzing the reflected ultraviolet rays. In other embodiments, the viewpoint detector 220 may detect the user's viewpoint by analyzing data about the user's eyeball(s) taken by the camera. Although the viewpoint detector 220 is described as using ultraviolet rays and/or the camera herein, the viewpoint detector 220 and the present invention are not limited thereto.

The viewpoint detector 220 may determine a location of the display unit 260 (e.g., a center of the display unit 260) with respect to the user's viewpoint as the viewpoint signal VS. Referring to FIG. 5A the viewpoint signal VS generated by the viewpoint detector 220 may include displacement information. The displacement information may include direction information and distance information. For example, when the user changes her viewpoint from a center V1 of the display unit 260 to an edge V2 of the display unit 260 as described in FIG. 5A, the viewpoint detector 220 may provide a left direction A (e.g., a horizontal direction or horizontal component) and an upward direction B (e.g., a vertical direction or vertical component) as the viewpoint signal VS. In this case, A and B may represent a real distance or a number of pixels.

Referring to FIG. 5B, the viewpoint signal VS may include coordinate information. For example, when the user changes her viewpoint from the center V1 of the display unit 260 to the edge V2 of the display unit 260 as described in FIG. 5B, the viewpoint detector 220 may provide a coordinate (A, B) as the viewpoint signal VS. In this case, A and B may represent a distance (e.g., a distance having units, such as μm, mm, cm, etc.) or a number of pixels. Although the viewpoint signal VS output is described as including the displacement information or the coordinate information, the viewpoint signal VS and the present invention are not limited thereto.

The controller 240 may locate the user's viewpoint (e.g., may shift the user's viewpoint to be) at the center of the display unit 260 by moving the display unit 260 based on the viewpoint signal VS and generating a compensation image signal corresponding to the viewpoint signal VS. As described above, the display quality at the edge of the display unit 260 may be worse than at the center of the display unit 260 because of the optical lens. When the user changes her viewpoint to the edge of the display unit 260, the controller 240 may move the display unit 260 such that the user's viewpoint is at the center of the display unit 260 and may generate an image signal in which the center of the display unit 260 corresponds to the user's viewpoint. For example, the controller 240 may prevent the user from recognizing a difference in display quality between the center of the display unit 260 and the edge of the display unit 260 by moving the display unit 260 and modifying the image according to the user's viewpoint.

The controller 240 may include a distance calculator 242, a first controller 244, and a second controller 246 (see, e.g., FIG. 4).

The distance calculator 242 may generate a moving signal SS by calculating a moving distance of the display unit 260 and the image signal based on the viewpoint signal VS. The distance calculator 242 may generate the moving signal SS corresponding to the viewpoint signal VS. The moving signal SS may include a direction and a distance to which the display unit 260 is to move and the image is to be modified.

When the viewpoint signal VS includes the distance information (e.g., the distance information having units, such as μm, mm, cm, etc.), the distance calculator 242 may calculate the number of pixels corresponding to the viewpoint signal VS and may output the number of pixels as the moving signal SS. When the viewpoint signal VS includes the number of the pixels, the distance calculator 242 may calculate the distance information corresponding to the viewpoint signal VS and may output the distance information as the moving signal SS. The distance calculator 242 may provide the moving signal SS that includes the distance information to the first controller 244 and may provide the moving signal SS that includes the number of the pixels to the second controller 246. In other embodiments, the distance calculator 242 may provide the moving signal SS that includes the distance information to the first controller 244 and the second controller 246, or may provide the moving signal SS that includes the number of the pixels to the first controller 244 and the second controller 246.

The distance calculator 242 may calculate a moving direction and a moving distance of the display unit 260 based on the displacement information and/or the coordinate information of the viewpoint signal VS. For example, when the viewpoint signal VS includes the displacement information including a left (e.g., horizontal) direction A and an upward (e.g., vertical) direction B or includes the coordinate information that includes a coordinate (A, B), the moving distance D of the display unit 260 and the image (e.g., the shifted image) is calculated by using Equation 1 and the moving direction α may be calculated by using Equation 2.

$$D=\sqrt{A^2+B^2}$$ Equation 1:

$$\alpha=\cos^{-1}(D/A)$$ Equation 2:

The distance calculator 242 may output the moving signal SS that includes the moving direction and the moving distance.

The first controller 244 may move the display unit 260 based on the moving signal SS. The first controller 244 may be a machinery device (e.g., a mechanical device) or an electronic device. The first controller 244 may move the display unit 260 such that the user's viewpoint is at the center of the display unit 260. When the user's eyes are focused at the edge of the display unit 260 as described in FIG. 6A, the first controller 244 may move the display unit 260 in order to locate the user's viewpoint (e.g., the user's eyes) at the center of the display unit 260. The first controller 244 may move the display unit a first distance during a non-emission period of a frame. When the moving distance included in the moving signal SS is greater than the first distance, the first controller 244 may move (e.g., may incrementally move) the display unit 260 during a plurality of frames (e.g., during non-emission periods of a plurality of frames). For example, when the moving distance included in the moving signal SS is 27 mm and the first distance is 10 mm, the first controller 244 may move the display unit 260 during the non-emission periods of three frames.

The second controller 246 may generate a compensation image signal CIS corresponding to a compensation image (e.g., a compensated image) based on the moving signal SS. The head mount display device 100 may store and/or receive image information that includes extended range with respect to the image displayed on the display unit 260 (e.g., that includes information beyond that which is displayed on the display unit 260 during normal operation). For example, the head mount display device 100 may receive a left-side image relative to the user, a right-side image relative to the user, an upward-side image relative to the user, a downward-side image relative to the user, a front-side image relative to the user, and backward-side (or back-side) image relative to the user (e.g., the head mount display device 100 may receive a 360° image, such as a virtual reality image) and may store the image signal. The second controller 246 may generate the compensation image signal CIS corresponding to the compensation image, a center of which corresponds to the user's viewpoint. For example, when the user's eyes look at (or focus on) the edge of the display unit 260 as described in FIG. 7A, the second controller 246 may generate a compensation image signal CIS that is shifted in the left direction and the upward direction such that the user's viewpoint is at the center of the display unit 260 as described in FIG. 7B. The user's viewpoint may be located at the center of the display unit 260 because the first controller 244 moves the display unit 260. The second controller 246 may generate the compensation image signal CIS that is shifted by a second distance (e.g., a second distance per frame). When the moving distance included in the moving signal SS is greater than the second distance, the compensation image signal CIS generated by the second controller 246 may include a plurality of frames. For example, when the moving distance included in the moving signal SS is 27 mm and the second distance is 10 mm, the second controller may generate the compensation image signal CIS for three frames.

As described above, the head mount display device 100 may display an image having uniform or substantially uniform display quality regardless of the user's viewpoint by moving the display unit 260, shifting the image, and generating the compensation image signal CIS corresponding to the shifted image according to the user's viewpoint.

Figure 8:
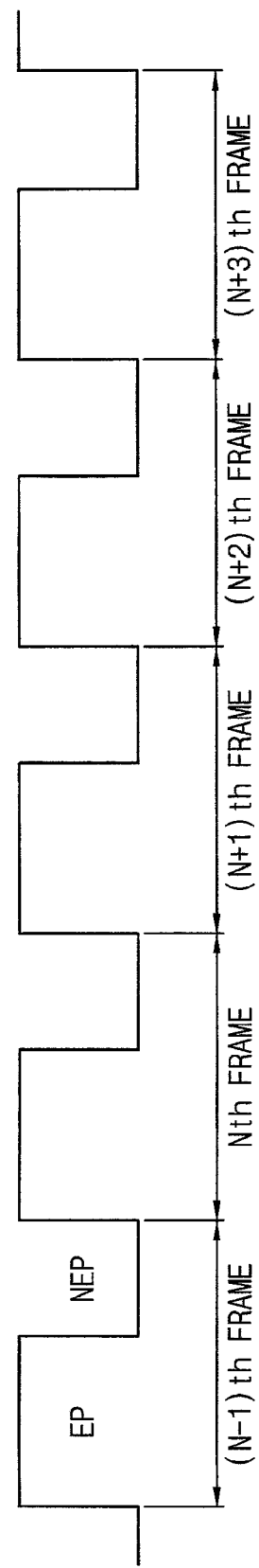
FIGS. 8 and 9 are diagrams illustrating an operation of the head mount display device shown in FIG. 4.
Figure 9:
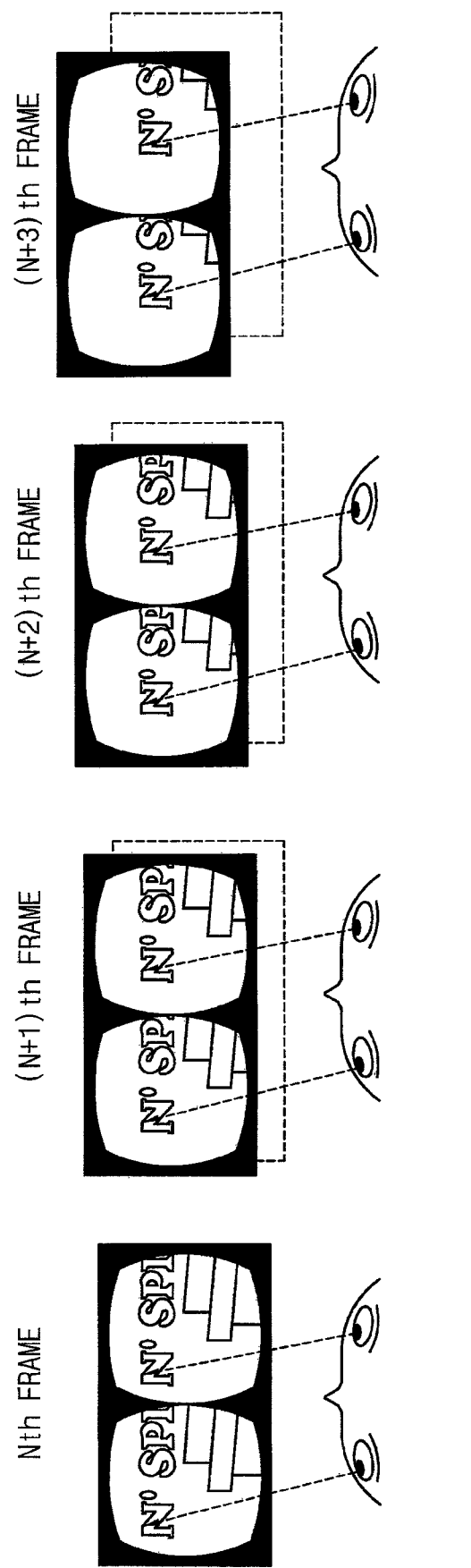

FIGS. 8 and 9 are diagrams illustrating an operation of the head mount display device 100 shown in FIG. 4.

Referring to FIG. 8, a display unit of a head mount display device may output an image signal by frames (e.g., a plurality of frames may be output to display an image). Each of the frames includes an emission period EP and a non-emission period NEP.

Referring to FIG. 9, a controller may move the display unit of the head mount display device per frame (e.g., may incrementally move the display unit during the non-emission period NEP of a number of sequential frames), and the controller may generate a compensation image signal. When a user's eyes are looking at (e.g., focused at) an edge of the display unit in an Nth frame, a viewpoint detector may detect the user's viewpoint based on the user's eyes and may generate a viewpoint signal.

The controller may move the display unit and may generate the compensation image signal based on the viewpoint signal. The first controller may move the display unit a first distance during the non-emission period NEP of one or more frames. When a moving distance of the display unit is greater than the first distance, the first controller may move the display unit during the non-emission periods of a plurality of frames as described in FIG. 9. For example, when the moving distance of the display unit is 27 mm and the first distance is 10 mm, the first controller may move the display unit 10 mm during the non-emission period NEP of an (N+1)th frame, 10 mm during the non-emission period NEP of an (N+2)th frame, and 7 mm during the non-emission period NEP of an (N+3)th frame.

The second controller may generate the compensation image signal corresponding to a compensation image (e.g., a compensated image) that is shifted by a second distance per frame. When a moving distance (e.g., shifting distance) of the image is greater than the second distance, the second controller may generate a compensation image signal for a plurality of frames as described above with respect to FIG. 9. For example, when the moving distance of the image signal is 27 mm and the second distance is 10 mm, the second controller may generate the compensation image signal that is shifted by 10 mm in the (N+1)th frame, 10 mm in the (N+2)th frame, and 7 mm in the (N+3)th frame.

As described above, the user's viewpoint may be located (e.g., may be shifted to be) at the center of the display unit by detecting the user's viewpoint, moving the display unit based on the detected viewpoint, and generating the compensation image signal. Thus, the user may not recognize a degradation of image quality at the edge of the display unit.

FIG. 10 is a flowchart illustrating an operation method of a head mount display device according to an example embodiment.

Referring to FIG. 10, an operation method of a head mount display device may include displaying a first image on a display unit to a user based on a first image signal S100, detecting the user's viewpoint corresponding to the eyes of a user who is viewing the image S200, calculating moving distances of the display unit and the first image based on the detected viewpoint S300, moving the display unit based on the moving distance S400, generating a second image signal, which is a shifted or compensated version of the first image signal based on the moving distance S500, and displaying a second image on the display unit based on the second image signal S600.

The operation method of the head mount display device may include displaying the first image on the display unit based on the first image signal S100. The display unit may display a left-side image corresponding to the user's left eye and a right-side image corresponding to the user's right eye. The left-side image and the right-side image may be the same or may be different from each other. The display unit may include an optical lens that induces (e.g., focuses) the image to the user's eyes. The image may be distorted at edges of the display unit. Thus, a display quality of an image at a center of the display unit and a display quality of the image at the edge of the display unit may be different from each other due to, for example, the optical lens.

The operation method of the head mount display device may include detecting of the viewpoint corresponding to the eyes of the user who is viewing the image S200. The head mount display device may include a viewpoint detector. The viewpoint detector may detect the user's viewpoint by using ultraviolet rays and/or a camera. The viewpoint detector may provide a location of the display unit corresponding to the user's viewpoint as a viewpoint signal. For example, the viewpoint signal may include displacement information or coordinate information.

The operation method of the head mount display device may include calculating of the moving distance of the display unit and/or a first image based on the user's viewpoint S300. The head mount display device may include a controller. The controller may calculate the moving distance of the display unit and the first image based on the viewpoint signal provided by the viewpoint detector. For example, the moving signal may include a moving direction and a moving distance (e.g., a vector).

The operation method of the head mount display device may include moving of the display unit based on the moving distance S400. The controller may move the display unit based on the moving signal that includes the moving direction and the moving distance. The display unit may be moved by a machinery device (e.g., a mechanical device) or an electronic device. The display unit may move a first distance during a non-emission period of a frame. The display unit may move during a plurality of frames when the moving distance included in the moving signal is greater than the first distance.

The operation method of the head mount display device may include generating of the second image signal corresponding to a second image to which the first image is shifted based on the moving distance S500. The controller may generate the second image signal corresponding to the second image, which is a modified version of the first image based on the moving signal that includes the moving direction and the moving distance. The controller may generate the second image signal corresponding to the second image to which the first image is shifted by a second distance per frame. The second image signal may be generated for a plurality of frames when the moving distance is greater than the second distance. The controller may generate a left-side compensation image signal corresponding to the user's left eye and a right-side compensation image signal corresponding to the user's right eye.

The operation method of the head mount display device may include displaying of the second image on the display unit based on the second image signal. The user may watch (or view) the image displayed at the center of the display unit without shifting her eyes to the edge of the display unit when the first image is displayed by moving the display unit and displaying the second image, which is a shifted version of the first image.

As described above, the operation method of the head mount display device may locate the user's viewpoint at the center of the display unit by moving the display unit and the image displayed on the display unit according to the user's viewpoint. Thus, the user may not recognize distortion of the image at the edge of the display unit.

The present inventive concept may be applied to a display device and an electronic device having the display device. For example, the present inventive concept may be applied to a computer monitor, a laptop, a digital camera, a cellular phone, a smart phone, a smart pad, a television, a personal digital assistant (PDA), a portable multimedia player (PMP), an MP3 player, a navigation system, a game console, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept. Accordingly, all such modifications are intended to be included within the scope of the present inventive concept as defined in the claims and their equivalents. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

What is claimed is:

1. A head mount display (HMD) device comprising:
    a display unit configured to display an image to a user based on an image signal;
    a viewpoint detector configured to detect a viewpoint corresponding to an object of the user's focus and configured to generate a viewpoint signal; and
    a controller configured to move the display unit based on the viewpoint signal and to generate a compensation image signal corresponding to the viewpoint signal such that the object of the user's focus is at a center of the display unit.

2. The head mount display device of claim 1, wherein the controller comprises:
    a distance calculator configured to calculate a moving distance of the display unit and the image signal based on the viewpoint signal and to generate a moving signal;
    a first controller configured to move the display unit based on the moving signal; and
    a second controller configured to generate the compensation image signal corresponding to a compensation image, the compensation image being a shifted version of the image based on the moving signal.

3. The head mount display device of claim 2, wherein the first controller is configured to move the display unit a first distance during a non-emission period of a frame.

4. The head mount display device of claim 3, wherein the first controller is configured to move the display unit during a plurality of frames.

5. The head mount display device of claim 2, wherein the second controller generates the compensation image signal corresponding to the compensation image shifted by a first distance during the non-emission period of a plurality of frames.

6. The head mount display device of claim 2, wherein the second controller generates a left-eye compensation image signal corresponding to the user's left eye and a right-eye compensation image signal corresponding to the user's right eye.

7. The head mount display device of claim 1, wherein the viewpoint signal comprises displacement information.

8. The head mount display device of claim 1, wherein the viewpoint signal comprises coordinate information.

9. The head mount display device of claim 1, wherein the display unit displays a left-eye image corresponding to the user's left eye and a right-eye image corresponding to the user's right eye.

10. The head mount display device of claim 9, wherein the left-eye image and the right-eye image are the same.

11. The head mount display device of claim 9, wherein the left-eye image and the right-eye image are different from each other.

12. An operation method of a head mount display (HMD) device, the operation method comprising:
    displaying a first image on a display unit based on a first image signal;
    detecting a viewpoint corresponding to eyes of a user who is viewing the first image;
    calculating a moving distance of the display unit and the first image based on the detected viewpoint;
    moving the display unit based on the moving distance;
    generating a second image signal corresponding to a second image, the second image being a shifted version of the first image based on the moving distance; and
    displaying the second image on the display unit based on the second image signal.

13. The operation method of claim 12, wherein the display unit moves a first distance based on the moving distance during a non-emission period of a frame.

14. The operation method of claim 13, wherein the display unit moves during a plurality of frames.

15. The operation method of claim 12, wherein the second image signal corresponding to the second image is generated for a plurality of frames, the second image signal being shifted by a first distance for each of the frames.

16. The operation method of claim 12, wherein the generating of the second image signal comprises:
    generating a left-eye compensation image signal corresponding to the user's left eye; and
    generating a right-eye compensation image signal corresponding to the user's right eye.

17. The operation method of claim 12, wherein the detected viewpoint comprises displacement information with respect to a center of the display unit.

18. The operation method of claim 12, wherein the detected viewpoint comprises coordinate information with respect to a center of the display unit.

19. The operation method of claim 12, wherein, when the second image is displayed on the display unit, the detected viewpoint is at a center of the display unit.

20. A head mount display (HMD) device comprising:
    a housing;
    a display unit accommodated in the housing and configured to display an image to a user based on an image signal;
    a viewpoint detector configured to detect the user's viewpoint and configured to generate a viewpoint signal corresponding to the user's viewpoint; and
    a controller configured to move the display unit within the housing based on the viewpoint signal and to generate a compensation image signal corresponding to the viewpoint signal, the compensation signal being a shifted version of the image signal such that the image displayed by the display unit is shifted as the display unit moves within the housing.

* * * * *